Figure 1:
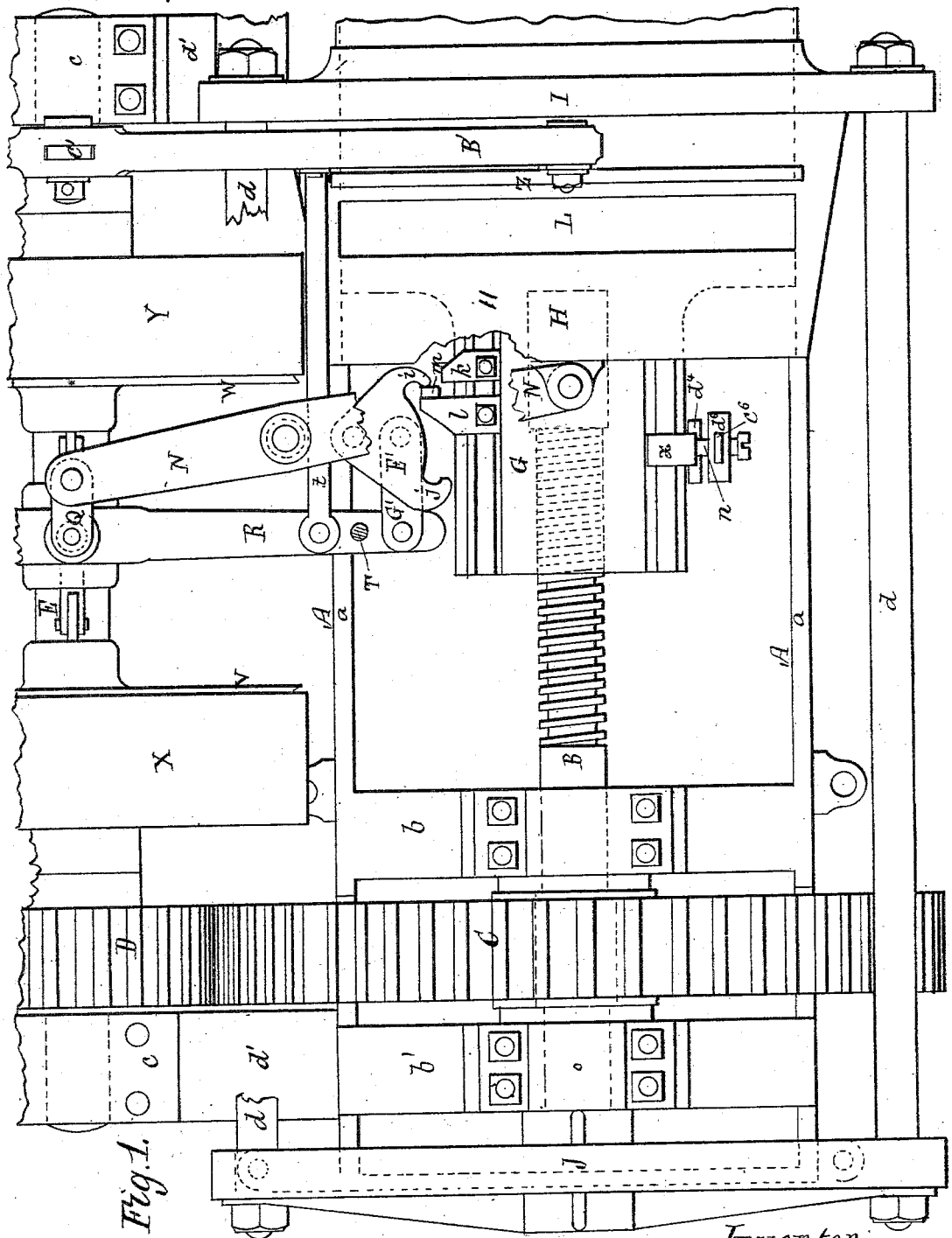

(No Model.) 5 Sheets—Sheet 1.

W. A. MORRISON.
METHOD OF AND DEVICE FOR PREPARING AND PACKING BRAN, &c.

No. 281,288. Patented July 17, 1883.

Witnesses.
H. E. Lodge
M. D. Porter

Inventor.
Wm. A. Morrison,
F. Curtis. Atty.

(No Model.) 5 Sheets—Sheet 2.
W. A. MORRISON.
METHOD OF AND DEVICE FOR PREPARING AND PACKING BRAN, &c.
No. 281,288. Patented July 17, 1883.
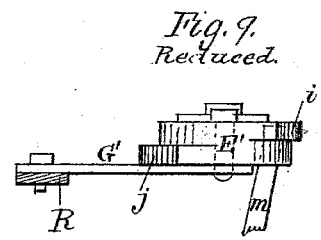
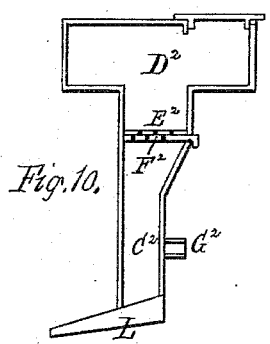
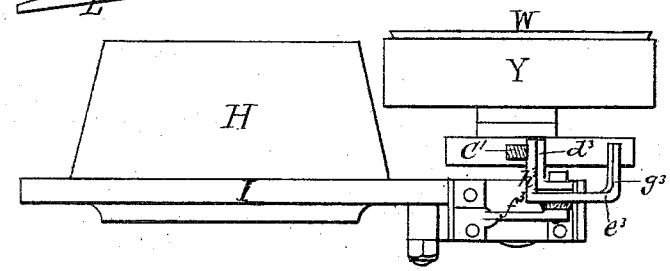
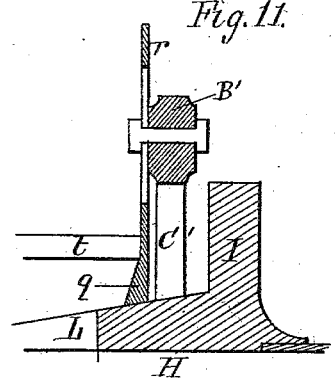
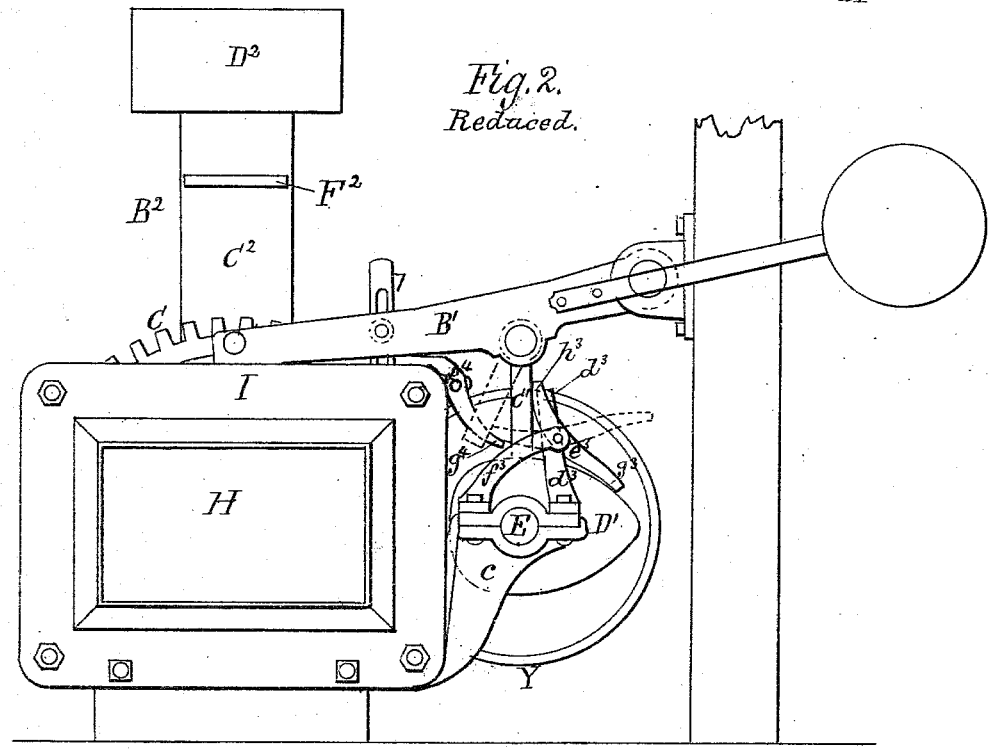
Witnesses.
H. E. Lodge
M. D. Porter
Inventor.
Wm. A. Morrison.
F. Curtis, Atty.

(No Model.) 5 Sheets—Sheet 3.
W. A. MORRISON.
METHOD OF AND DEVICE FOR PREPARING AND PACKING BRAN, &c.
No. 281,288. Patented July 17, 1883.
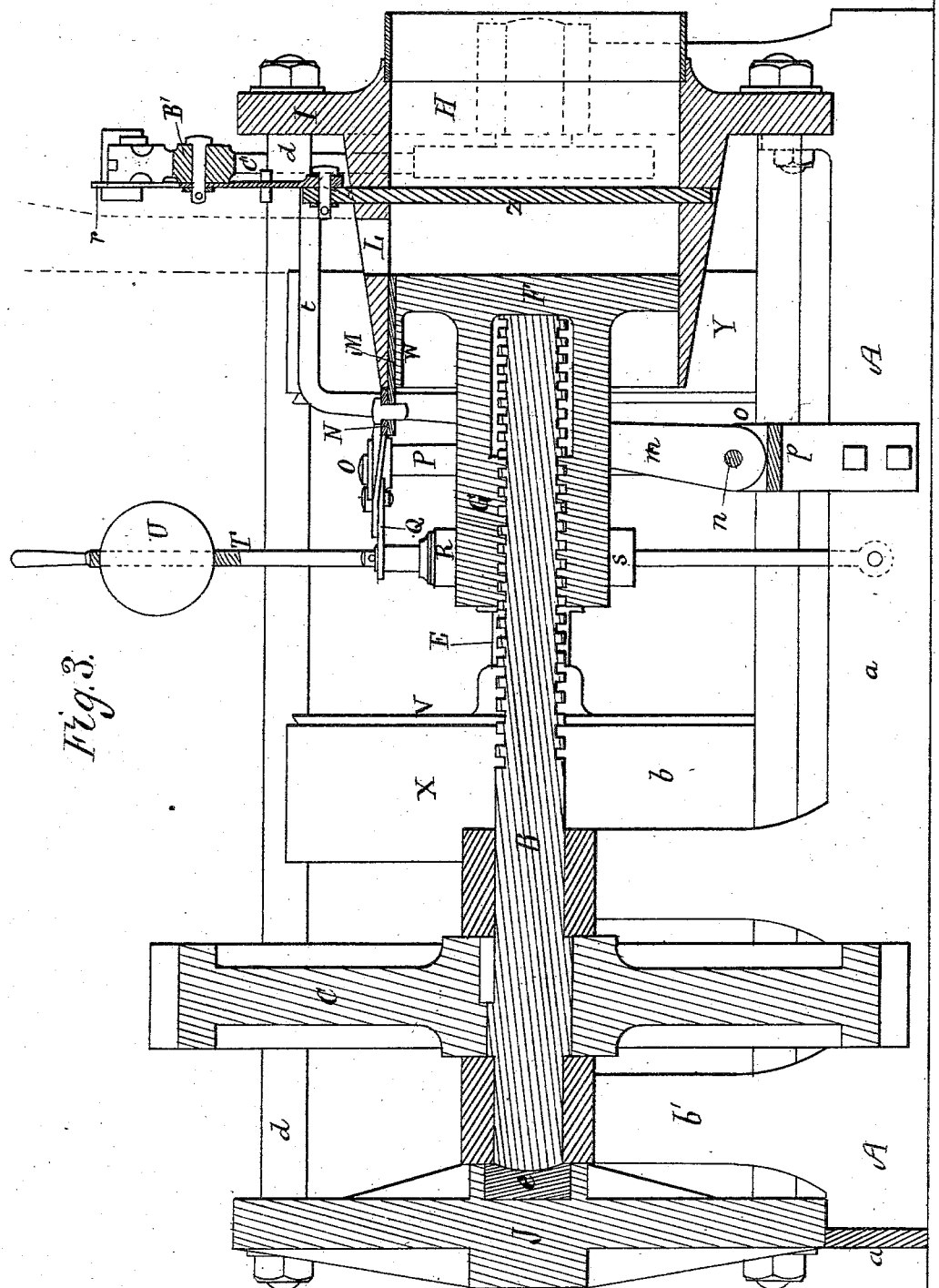
Witnesses.
H. E. Lodge
M. D. Potter
Inventor.
Wm. A. Morrison.
F. Curtis, Atty.

(No Model.) 5 Sheets—Sheet 4.
W. A. MORRISON.
METHOD OF AND DEVICE FOR PREPARING AND PACKING BRAN, &c.
No. 281,288. Patented July 17, 1883.
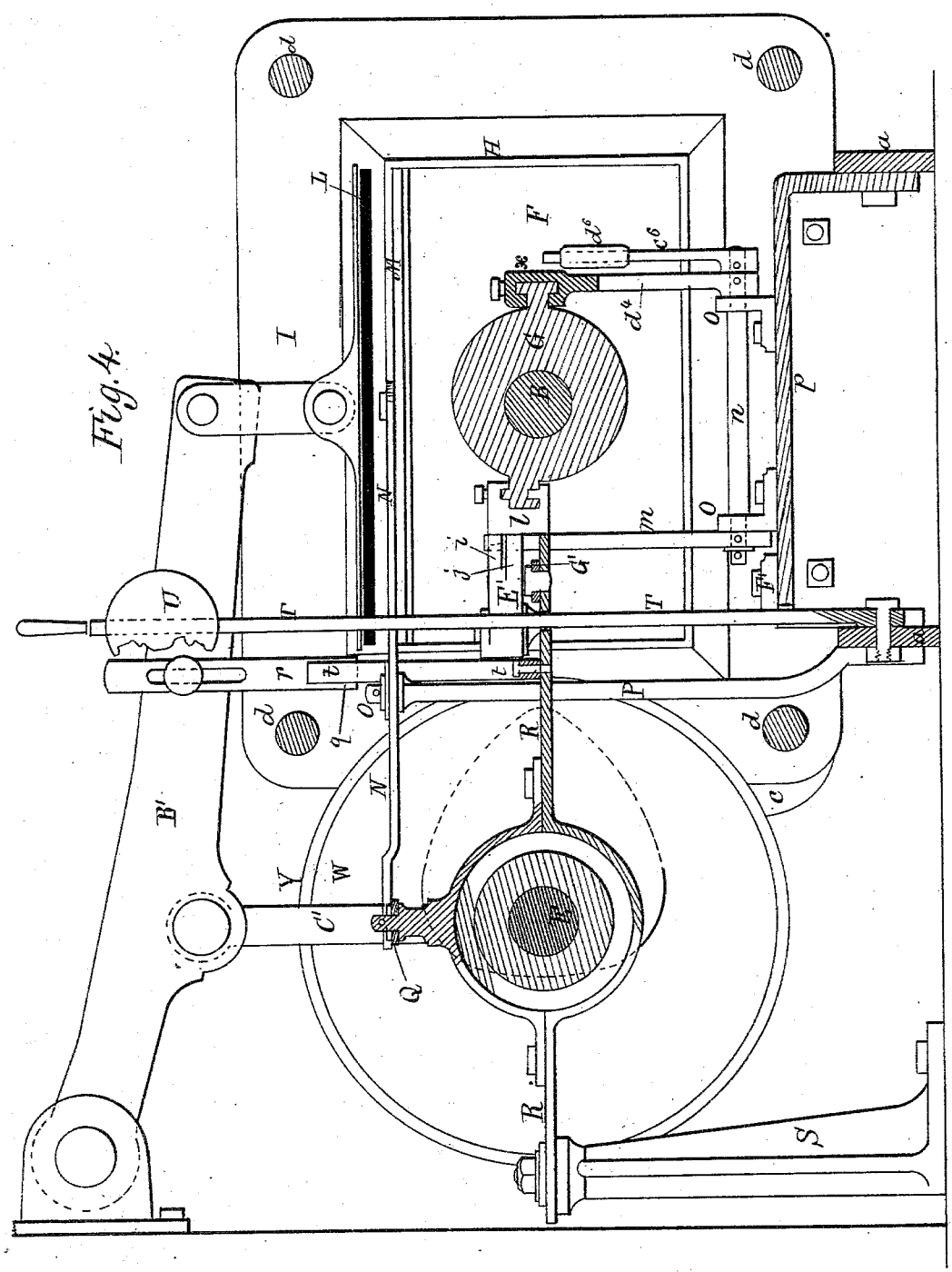
Witnesses.
H. E. Lodge
M. D. Porter
Inventor.
Wm. A. Morrison.
F. Curtis, Att'y.

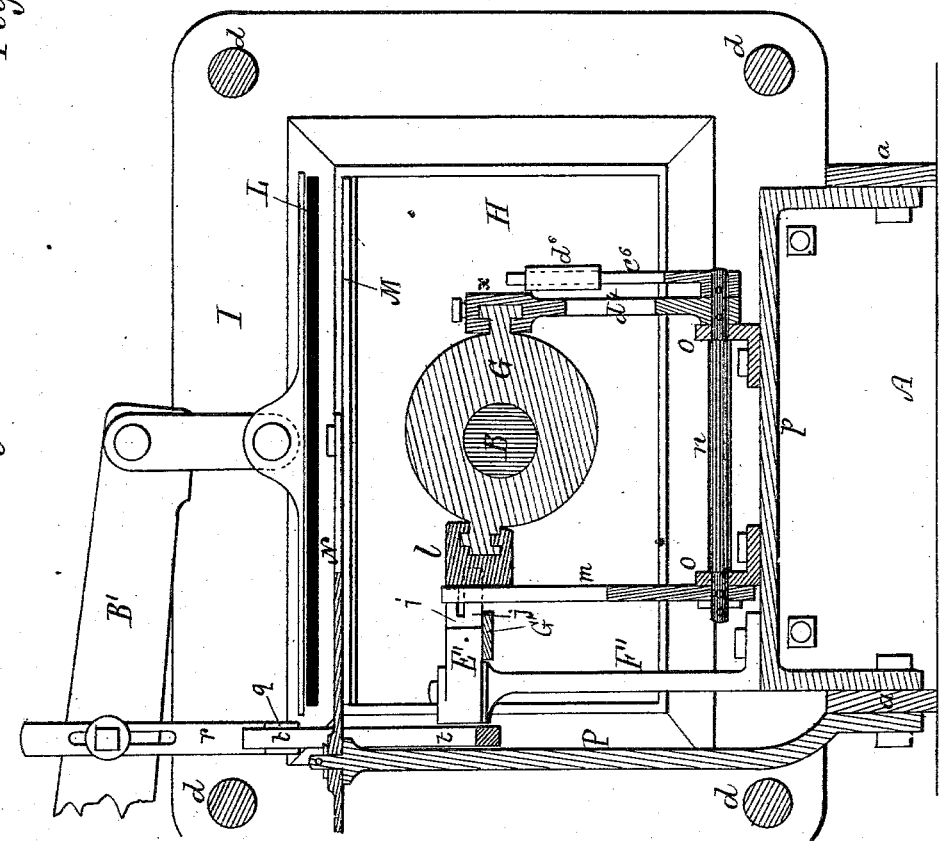
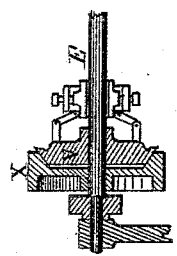

UNITED STATES PATENT OFFICE.

WILLIAM A. MORRISON, OF CAMBRIDGE, MASSACHUSETTS.

METHOD OF AND DEVICE FOR PREPARING AND PACKING BRAN, &c.

SPECIFICATION forming part of Letters Patent No. 281,288, dated July 17, 1883.

Application filed April 12, 1883. (No model.)

*To all whom it may concern:*

Be it known that I, WILLIAM ALBERT MORRISON, a citizen of the United States, residing at Cambridge, in the county of Middlesex and State of Massachusetts, have invented certain new and useful Improvements in Methods of and Machinery for Preparing Bran and Analogous Articles; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The object of this invention is to prepare bran and other light porous substances for market by pressing the material into compact cakes of sufficient hardness and tenacity to bear handling and transportation.

My invention consists in certain details of construction of a machine for carrying out the above object, as well as in a peculiar manner of moistening the material before it enters the mold-box, my object in thus moistening said material being to prevent dust, increase its specific gravity, to aid its descent to the mold-box and its manipulation in such box, and to cause its particles to adhere effectually when pressed into a cake, owing to the moistening of the slight amount of gluten contained in it. In my machine I employ a mold-box open at front and rear and containing a plunger tightly fitting it and adapted to traverse its interior, the said plunger constituting a variable bottom or back to the box, while the front or mouth of such box is provided with a sliding gate, which alternately opens and closes such mouth. An opening is made in the top of the mold-box, through which the material enters, and this opening is governed by a sliding plate or cut-off to hold back at certain times the supply of material in the hopper. The motions of the plunger, gate, and cut-off with respect to the mold-box are such that the cut-off opens (the gate being previously closed) and allows material to enter and fill the box between the gate and plunger. The piston advances to the point requisite to compress the material into a cake of the desired thickness against the gate as an abutment. The advance of the piston next ceases and remains stationary during a pause, while the gate rises and opens the mouth of the mold-box, and at the end of this pause the piston completes its advance and pushes the cake forward beyond the path of movement of the gate, so as to be out of the way of the latter in its next descent. The piston next retracts, the gate falls, the cut-off opens, and a fresh supply of material flows into the mold-box, and these motions are rapidly continuous until the supply of material is exhausted, each cake, as it is pushed forward by the last advance of the piston, operating to feed forward and expel from the box the foremost one of those previously pressed. The bran or other material is fed to the mold-box through a suitable hopper which contains a reticulated or foraminous partition which minutely subdivides such material, while below said partition I introduce into the hopper a jet of steam, which intercepts the comminuted material in its passage to the mold and moistens the same, for purposes before stated.

The mechanical devices by which the functions of the machine are carried out will be hereinafter duly explained.

The drawings accompanying this specification represent, in Figure 1, a plan, Fig. 2 an end view, Fig. 3 a longitudinal section, and Figs. 4 and 5 cross-sections, of a machine containing my invention. Fig. 6 is a side view, and Fig. 7 a cross-section, of a portion of the shipping mechanism. Fig. 8 is a plan of the mechanism connected with the lever for hoisting the gate of the mold-box. Fig. 9 represents a plan of the sectoral plate. Fig. 10 is a vertical section of the hopper. Fig. 11 is a section of a portion of the device for shipping the driving mechanism, to be hereinafter explained.

In said drawings the base-frame of the machine is shown as composed of an open base, A, consisting of horizontal side rails, $a\ a$, and upright standards $b\ b'$.

The horizontal screw-threaded shaft for driving the reciprocating plunger is shown at B as mounted in the standards $b\ b'$ and rotated by a spur-gear, C, which is driven by a pinion, D, secured to a driving-shaft, E, mounted in bearings $c\ c$ in extensions $d'\ d'$ of the standards $b\ b'$, this shaft E carrying the friction-clutch mechanism, to be hereinafter described.

The plunger for first pressing and afterward expelling the cakes is shown at F as a flat vertical plate formed upon the front end of a horizontal hub, G, into which the screw-threaded portion of the screw B screws. The plunger F traverses a rectangular mold-box, H, formed upon or secured to the rear side of a vertical open head, I, erected upon the front of the base-frame A, this head I being securely bolted by horizontal bolts $d\ d\ d\ d$ to a second but solid head, J, disposed in rear of the standard $b'$, and resting upon but not secured to the base-frame A, the rear end of the screw-shaft B being stepped in a plate, $e$, secured to such head J.

The chute or hopper for delivering the material to the mold-box is shown at K, communicating at its lower end with a feed-opening, L, in the top of the rear part of the box H, this opening being closed by a horizontal plate or cut-off, M, sliding in guides in the upper part of said box, and operated by horizontal lever N, pivoted at its front end to it, this lever being fulcrumed, as shown at O, to the top of a vertical post, P, erected upon the frame A, to one side, and immediately in rear of the mold-box, the outer end or tail of said lever being in turn pivoted to one end of a horizontal link, Q, the opposite end of which link is pivoted to the top of a horizontal shipper-bar, R, disposed to one side of the frame A and in rear of the lever H, the outer end of the shipper-rod being pivoted to a post, S, erected upon the floor of the apartment. (See Fig. 3.) The shipper-bar R is actuated by a vertical shipper-rod, T, which is pivoted at its lower end to the side rail, $a$, of the frame A, and passes upward loosely through the inner end of the said shipper-bar, and preferably carries upon its upper end an adjustable weight, U, the momentum of which aids in imparting a quick movement to the shipper-bar. The shipper-bar R operates with a clutch mechanism composed as follows: To the shaft E, I secure twin conical disks V W, which operate with twin concave pulleys X Y, mounted loosely upon the said shaft E, each pulley being shrugged upon such shaft by means commonly employed in this class of clutches, and rotating in opposite directions.

The sliding gate or bulk-head, which constitutes the shifting head of the mold-box, is shown at Z as a thin vertical plate sliding in guides in opposite sides of the front of the interior of the mold-box, and when in its lowest position tightly closing the front mouth of such box, this gate being operated by horizontal lever $B'$, disposed above it, the inner end of such lever being pivoted to the top of the gate, while the outer end of said lever is pivoted to a post erected upon the floor of the apartment, or to any suitable object. The lever $B'$ is operated by an arm, $C'$, pendent from it, which rests upon the periphery of a heart-shaped wiper-cam, $D'$, secured to the hub of the front pulley, Y. (See Fig. 2.)

In the operation of this machine the gate Z first lowers to close the mouth of mold-box, the plunger next advances and presses the bran into the desired cake, the gate rises, and the plunger advances a short distance farther to remove the cake out of the path of the descending gate. To carry out these movements I employ the following mechanism:

$E'$ represents a horizontal sectoral plate pivoted to the top of a post, $F'$, erected upon the base-frame A, inside of the post P, before-named, (see Fig. 5,) this sectoral plate being vibrated upon its pivot by a link, $G'$, one end of which is pivoted to it, while the opposite end of such link is pivoted to the extreme inner end of the shipper-bar R. The plate $E'$ has two peripheral teeth, $i\ j$, operating with two dogs, $k\ l$, secured adjustably to one side of the hub G of the plunger F. These teeth $i\ j$ are in different horizontal planes, the foremost tooth being the highest. The foremost dog, $k$, operates to ship the clutch mechanism and stop the plunger during the rearward or retreat traverse of said plunger, while the rearmost dog, $l$, operates to ship the clutch mechanism and reverse the direction of the driving-shaft during the forward movement of the plunger in pressing the cake. The active portion of the dog $k$ is in a horizontal plane with tooth $j$, and below the plane of the tooth $i$, in order to have no effect upon the latter, while the active portion of the tooth $l$ is in a plane with the tooth $i$ and above the plane of the tooth $j$ and dog $k$. The rearmost dog, $l$, operates to ship the clutch mechanism and stop the plunger during the forward traverse of such plunger in pressing a cake, while the foremost dog, $k$, operates to ship the clutch mechanism and reverse the direction of the driving-shaft during the retreat of the plunger and the filling of the mold-box with fresh material. The dog $k$ acts directly upon the tooth $j$ to vibrate the sector and ship the shipper-bar, by which the entire retreat of the plunger is effected at one continuous movement. To effect an intermediate stoppage of the forward traverse of the plunger, in order to allow the gate Z to rise and permit the cake to be expelled from the mold-box, I employ an upright vibrating bar, $m$, pivoted at its lower end to one end of a horizontal rock-shaft, $n$, mounted in bearings $o\ o$, erected upon a cross-bar, $p$, spanning the frame A, the arm $c^6$ carrying upon its upper end a counterpoise-weight, $d^6$. As the plunger moves forward by the action of the screw to press the cake, the dog $l$ abuts against the upper and free end of the bar $m$, and forces such bar forward until the cake has been pressed to the desired thickness, when said bar $m$, by the action of the counterbalance-weight $d^6$, drops below the path of movement of the sector and of the dog $l$, this dropping away of the arm from the plane of the tooth allowing the plunger and its dog $l$ to advance until such dog strikes the tooth $i$ of the sector—that is to say, a distance equal to the width of the bar $m$—and the cake is driven forward beyond the gate Z, while at the same time the sector is rocked an equal distance and its tooth $j$ brought in contact with the dog $k$. As the screw is reversed and the plunger begins its retreat, as last explained, the lever N is operated to open the cut-off M by the link Q, operated by the shipper-bar R.

To maintain the feed-opening L of the mold closed until the plunger F, in its retreat, passes to the rear of such opening, I add to the top of the plunger a leaf or extension, $w$. (See Fig. 3.) As the gate Z reaches its highest point, as last described, it is necessary that the plunger begin to retreat and the gate be held up until the plunger arrives beneath it, as the cam allows the arm to drop before this takes place, when the gate rests upon the plunger until the latter retreats from beneath it and the gate drops by its own gravity. To effect the retreat of the plunger by reversing the rotation of the screw, I employ a vertical wiper cam or wedge, $q$, (see Figs. 5 and 11,) formed upon the lower end of a bar, $r$, secured adjustably to the rear side of the lever B', such cam or wedge wiping against the front end of a rigid curved arm, $t$, secured at its rear end to the inner end of the shipper-bar R. As the lever B' reaches its highest point, the cam or wedge $q$, crowding against the end of the arm $t$, throws the shipper-bar R to the point necessary to reverse the screw B. The plunger is now at its extreme forward point, the gate raised to its fullest extent, the cake expelled from the mold-box, and the cut-off shut, with the dog $k$ in front of and against the tooth $j$ of the sector. To uphold the gate Z until the plunger, in its retreat, arrives beneath it, I cut in the lower part of each edge of the gate a notch, and operating with this notch I add to the adjacent part of the top of the mold-box a spring-latch so arranged that as the wedge reaches its highest point it shall crowd the nose of the latch into the notch. The position of the latch with respect to the notch, plunger, and wedge is such that as the plunger arrives beneath the gate Z the latch is removed from the notch, and the gate drops upon and is upheld by the plunger, and as the latter passes by the gate such gate drops and closes the mouth of the mold-box. The material now begins to descend into the mold-box in front of the retreating plunger until the latter completes its retreat, the mold-box at that time being filled.

In order to introduce the upper end of the arm $m$ between the dog $l$ and the tooth $i$ of the sector E' as the plunger executes its retreat, I secure to the opposite side of the hub G of the plunger a third dog, $x$, so arranged as to intercept the counterbalance-arm $c^5$, or a finger, $d^4$, secured to the shaft $n$, and throw the bar $m$ rearward against said tooth $j$; or the arm $m$ may abut against a rigid stop suitably situated. As the plunger completes its retreat, the dog $x$ carries the counterpoise-weight over its center, the shipper-rod is retracted, and the rotation of the screw B reversed, and the plunger begins a new forward movement. With the last-named movement of the shipper-rod the front end of the bar $t$ arrives over the wedge $q$.

To prevent the bar C' from falling away outward from the cam D', I employ a post, $d^3$, erected upon the standard $c$. To trip the bar I employ an oscillating latch, $e^3$, pivoted to a bracket, $f^3$, secured to the top of the standard $c$, the inner end of this latch bearing against the outer side of the lower end of the bar C', while the outer end of said latch, which overbalances the first, rests upon the periphery of the cam D'. The apex of the cam wipes against the outer end, $g^3$, of the latch $e^3$ and raises the latter, thereby depressing its inner end, $h^3$, and crowding the lower end of the bar C' out of the path of movement of the cam D'.

To free the pendent bar C' from the control of the latch $e^3$, I employ a curved trip-lever, $f^4$, pivoted at or about its center to the upper rear corner of the head I, the tail $g^4$ of this lever bearing upon the under side of the nose $h^3$ of the said latch $e^3$.

A wedge or inclined plane is secured to the front end of the curved bar $t$, hereinbefore mentioned, this wedge extending beneath the inner end of the lever $f^4$ in such manner that when the bar $t$ moves forward as the wedge $q$ is lowered, the first-named wedge raises the lower end of the lever $f^4$, and with the nose $h^3$ of the latch $e^3$, to a point, where the gravity of the bar C' restores the latter to its pendent position.

The hopper for introducing the material to the mold-box is shown at B² as composed of a vertical chute, C², erected upon the top of the mold-box and communicating at bottom with the feed-opening L, the upper part of this chute terminating in a bin, D², to receive the supply of material.

In the upper part of the chute C², I place a horizontal perforated partition, E, and below this partition I place a sliding gate, F², perforated similar to the partition E. When the gate is pushed in to its fullest extent, its intact portion closes the openings in the partition and prevents descent of material from the bin D². When the gate is pulled out to its extreme position, its holes correspond with those of the gate, and the material descends from the bin and fills the mold-box. An inlet-opening, G², is formed in the lower part of the chute C², and provided with a coupling for connection with a steam-pipe.

I claim—

1. A method of preparing bran and kindred substances for the market, consisting in feeding the material from bulk to a mold-box, in which it is measured and compressed into a cake, the cakes being expelled in succession from such box as fast as completed.

2. In machinery for converting bran and analogous substances into compact cakes, a mold-box to receive and measure the material, a plunger adapted to traverse such box and compress the material, and an adjustable gate governing the discharge-mouth of said box, such gate, when in one extreme position, constituting a bulk-head which closes the mouth of the box, and against which the cake is compressed, and in the other position opening the box and permitting escape of such cake, substantially as and for purposes set forth.

3. In combination, the mold-box, the gate, the plunger, and the cut-off plate, with the feed-opening governed by such gate, substantially as set forth.

4. A step in the process of forming bran and analogous substances into portable cakes, which consists in discharging steam into the material in its descent to the mold-box.

5. In machines for forming bran and analogous substances into compact cakes, the combination, with mechanism for reducing the material to solid cakes, of means for introducing a current of steam to intercept and moisten such material in its passage to the molding-chamber.

6. The herein-described hopper, consisting of the chute $C^2$, with its partition $E^2$, and gate $F^2$, and inlet-port $G^2$ and the bin $D^2$.

7. In combination, the lever B', cam D', bar C', wedge $q$, bar $t$, and shipper-bar R, substantially as stated.

8. The combination, with the mold-box and its plunger, of the cut-off, its lever N, and the shipper-bar R, substantially as and for purposes set forth.

9. In combination with the mold-box and its plunger, the dogs $k\,l$, the sector E', with its teeth $i\,j$, and the bar $m$, the dog $x$, and counterbalance-arm $c^6$, secured to the rock-shaft which carries the said arm $m$, substantially as described.

10. In combination, the mold-box and its plunger, the cut-off, the lever N, connecting such cut-off with the shipper-bar R, the sector E', with its teeth $i\,j$, the dogs $k\,l$, secured to and moving with the plunger, the shipper-bar R, and the clutch mechanism with which such bar operates, substantially as set forth.

11. The combination, with the mold-box, its plunger, and the cut-off, of the lever N, shipper-bar R, and sector E', with its teeth $i\,j$, the sector being linked to the shipper-bar, and the lever pivoted at its tail to said bar, substantially as herein described.

12. The sector, with its teeth $i\,j$, in combination with the plunger and the dogs $k\,l$, carried by such plunger, the sector being connected with and operating to reverse the shipper-bar, substantially as set forth.

13. In combination with the lever B' and gate Z, the wedge $q$, curved bar $t$, and shipper-bar R, carrying such bar $t$, substantially as stated.

14. The combination, with the sector and its dogs $k\,l$, and the shipper-bar R, of the arm $m$, carried by the rock-shaft $n$, and adapted to interpose its upper end between the dog $k$ and the forward tooth of the sector, substantially as hereinbefore described.

15. In combination with the lever B', its pendent arm C', and the cam D', the post $d^3$ and latch $h^3$, the latter being pivoted to the bracket $f^3$, substantially as set forth.

In testimony whereof I affix my signature in presence of two witnesses.

WILLIAM ALBERT MORRISON.

Witnesses:
H. E. LODGE,
F. CURTIS.